United States Patent Office 3,427,132
Patented Feb. 11, 1969

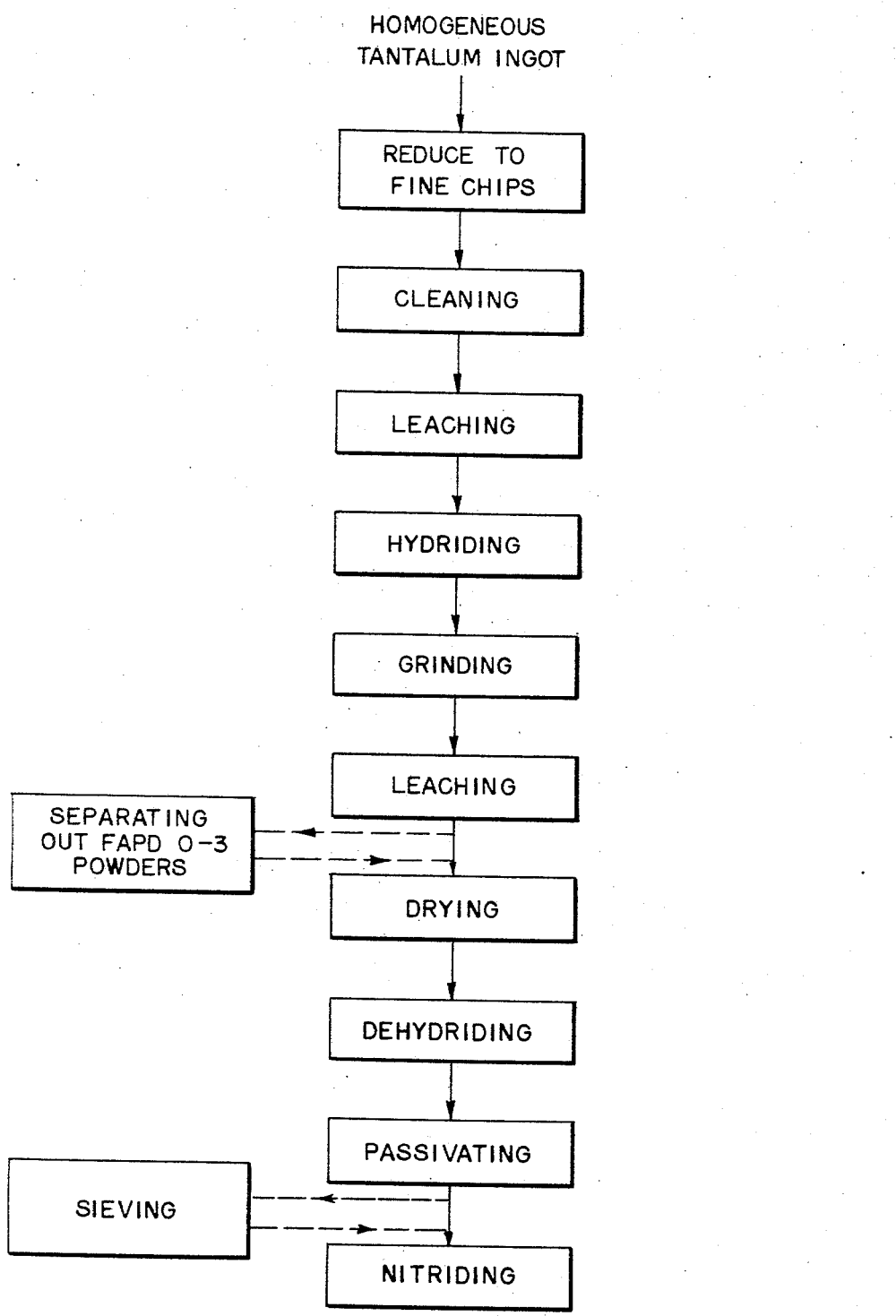

3,427,132
TANTALUM NITRIDE POWDER AND METHOD
FOR ITS PREPARATION
Edward J. Goon, Needham, Mass., assignor to National Research Corporation, Newton Highlands, Mass., a corporation of Massachusetts
Filed Apr. 12, 1967, Ser. No. 630,366
U.S. Cl. 23—204                                            5 Claims
Int. Cl. C01b 21/06; C22c 29/00

ABSTRACT OF THE DISCLOSURE

Tantalum nitride powders, of homogeneous epsilon-phase composition made by hydriding tantalum, milling to fine powder, dehydriding and nitriding the powder.

---

The present invention relates to production of tantalum nitride powders useful in the production of film resistors and as a general purpose electrical and refractory material. In use, the tantalum nitride powders are consolidated by sintering techniques to form coherent structures, either self-supporting or supported on another material.

In the prior art, tantalum nitride is formed in situ by nitriding tantalum powders on a resistor surface. This is subject to the defect of formation of multiple phases of tantalum nitride and/or difficulties in production. Other techniques such as reactive sputtering to form tantalum nitride are slow.

It is the principal object of the invention to provide a tantalum nitride product consisting of preformed powders consisting essentially entirely of the desirable epsilon-phase of tantalum nitride.

It is a further object of the invention to provide a method of making such powders.

Other objects, features and advantages of the invention will be obvious from the foregoing and from the following description taken in connection with the accompanying drawing which is a flow chart of the method of the invention.

According to the method of the present invention a tantalum starting material such as an arc melted tantalum ingot is broken down into particulate form, preferably by shaving an ingot on a lathe to obtain thin chips. The chips are then hydrided by heating in a hydrogen atmosphere to diffuse hydrogen completely through the chips. The hydrided chips are then ground to powder in a ball mill. All the foregoing steps and accompanying cleaning and leaching steps are similar to those used in the manufacture of capacitor grade tantalum powder as described in Patent 3,295,951 to Fincham and Villani. The powders are characterized in that the total content of metallic and interstitial impurities (C, O, N) are in solution with the tantalum. The powders are further characterized in that they have particle sizes essentially all less than 44 microns diameter (−325 mesh) and a Fisher average particle diameter (FAPD) of 6 microns or less as determined by the method published in 12 Ind. Eng. Chem. Anal. 479–482 (1940).

In a preferred embodiment of the invention, the hydrided tantalum powders are then classified by size to separate the FAPD–3 microns or less diameter tantalum particles. This is accomplished by trapping such fine powders in the leach liquors used in leaching the hydrided tantalum powders. The trapping is done by precipitating the powders from leach liquor in a settling tank which may be speeded up by using a coagulant electrolyte such as hydrochloric acid.

The fine powders are then dehydrided by heating in a vacuum furnace. It is necessary to then passivate the powders if the fine sizes are used because their extremely large surface area and high purity makes them vulnerable to absorbing oxygen in an exothermic reaction which results in excessive autocatalytic oxidation. This passivation is accomplished by bleeding air into the furnace slowly at the completion of the dehydriding operation with the result that a thin passivating film of oxide is formed on the surface of the powders.

The dehydriding step is carried out as described in the above Patent 3,295,951. Inevitably some brittle agglomerates are formed in the powder and these must be broken up in order to be useful. This is accomplished by running the entire batch of dehydrided powder through a minus 60 mesh sieve with agitation and lightly rubbing the larger agglomerates to break them up so that they can pass through the sieve.

Then the fine powders are nitrided in a controlled nitriding step which avoids sintering and effects complete conversion of the tantalum powders to epsilon-phase tantalum nitride. In this step, the powders are heated to 950° C. in vacuum. Then a partial at pressure of nitrogen (3 torr) is bled into the chamber and the temperature of the powders is raised to 1150° C. to completely convert the powders.

The resultant product is a tantalum nitride powder which is unsintered and is completely epsilon-phase tantalum nitride as identified by X-ray diffraction patterns and preferably has an average particle size of FAPD–3 or less and in no event greater than FAPD–6.

It is desirable to slowly air release the dehydriding furnace after dehydriding and it is absolutely essential to do so when using FAPD–3 or smaller powders. A typical schedule for this purpose is as follows:

(1) ring powders to room temperature after dehydriding.
(2) Bleed in air to the system at 10 minute intervals to raise the pressure.
    (a) to .1 torr
    (b) then to .5 torr (mm. Hg approx.)
    (c) then to 1 torr
    (d) then to 5 torr
    (e) then to 10 torr
    (f) then to 23 inches (Bourdon gauge)
    (g) then to 18 inches
    (h) then to 13 inches
    (i) then to 8 inches
    (j) then to 3 inches
    (k) to atmosphere
(3) Pump system down again to less than .1 torr and repeat except that the pressure rise from 28 inches to atmosphere is in 5 minute intervals.
(4) Repeat (3).

The passivating step forms only a very thin oxide film on the powders to passivate the surface.

The nitriding step involves initial diffusion of the thin oxide film into the tantalum and the amount of oxygen introduced by the foregoing passivation step is sufficiently small (3000–5000 p.p.m.) that it is readily diffused and dissolved into the tantalum powders to maintain homogeneity of its crystal structure which remains capable of uniform conversion to epsilon-phase tantalum mononitride.

The nitriding step is commenced by the above diffusion step together with or followed by exposure of the powder to a small partial atmosphere of nitrogen at a temperature no greater than 1000° C. and carried on by adding increasing amounts of nitrogen and increasing temperature to speed up the process, working to a maximum temperature of no greater than 1200° C. This prevents sintering.

In the nitriding furnace the powder is on a tray with a bed depth no greater than one inch. The furnace is evacuated to less than .1 micron. Then in a typical schedule, the furnace is heated to 950° C. This generally involves one and a half hours in coming to temperature which is adequate for oxygen diffusion which is more temperature than time dependent. Then the vacuum pumps are cut off and 3 torr of nitrogen is bled into the system. The furnace is adjusted to 1150° C. During this time the in-leakage is controlled to keep pressure between 2 and 3 torr. One hour after the original bleed-in of nitrogen, the presure is increased to 6 torr by adding more nitrogen and held at this pressure for 15 minutes and then—

(a) increased to 8 torr and held for 10 minutes
(b) increased to 28.5 inches and held for 10 minutes
(c) increased to 28.0 inches and held for 15 minutes
(d) increased to 27.5 inches and held for 5 minutes
(e) increased to 27.0 inches and held for 5 minutes
(f) increased to 25 inches and held for 15 minutes
(g) increased to 17 inches and held for 10 minutes
(h) increased to 9 inches and held for 60 minutes
(i) increased to 5 inches and held.

Nitrogen absorption is observed by shutting off the supply of nitrogen and observing the pressure drop over a test period of time. Completion of nitriding for present purposes is indicated by a pressure drop of less than half an inch over a test period of 5 minutes. Then the furnace is cooled to room temperature under a full atmosphere of nitrogen.

What is claimed is:

1. Tantalum nitride powders in loose unsintered form, consisting essentially of homogeneous epsilon-phase tantalum nitride powders of particle size less than 44 microns and of Fisher average particle diameter no greater than 6 and with the impurities therein being substantially entirely in solid solution therewith.

2. Tantalum nitride powder as in claim 1 of average particle diameter no greater than Fisher average particle diameter 3.

3. Process of making tantalum nitride powder consisting of the steps of producing tantalum in sufficiently pure form that its metallic and interstitial impurities are substantially in solid solution therewith, then sequentially hydriding said tantalum, then comminuting said hydrided tantalum to fine powders of patricle size less than 44 microns and Fisher average particle diameter no greater than 6 microns, then dehydring and passivating the fine powders by producing thereon a protective surface oxide layer, then slowly heating said fine powders in the presence of nitrogen to diffuse said protective layer into the powder and react said powders with the introgen essentially without sintering thereof during the nitriding so that said powders are completely converted to homogeneous epsilon phase tantalum nitride, said nitride reaction to be carried out at a temperature of at least 950° C.

4. Process according to claim 3 wherein loose agglomerates in the powder are broken down before the nitriding step.

5. Process according to claim 3 wherein the nitriding comprises heating the powders at about 950° C. in vacuum and then exposing the powders to a partial atmosphere of nitrogen and raising the powder temperature to about 1150° C. and slowly raising the nitrogen pressure.

References Cited

UNITED STATES PATENTS

| | | | |
|---|---|---|---|
| 2,926,071 | 2/1960 | Alexander | 23—204 |
| 2,943,931 | 7/1960 | Hiller | 23—204 |

OSCAR R. VERTIZ, *Primary Examiner.*

H. S. MILLER, *Assistant Examiner.*

U.S. Cl. X.R.

23—191